United States Patent [19]
White

[11] 3,906,223
[45] Sept. 16, 1975

[54] ENCODER FOR ALTIMETERS

[75] Inventor: Robert E. White, Westbury, N.Y.

[73] Assignee: Victor E. Carbonara, Inc., Port Washington, N.Y.

[22] Filed: June 12, 1974

[21] Appl. No.: 478,439

[52] U.S. Cl............ 250/231 SE; 250/227; 250/570; 356/4; 73/387
[51] Int. Cl.²......................................... G01L 7/12
[58] Field of Search .. 250/570, 227, 231 P, 231 SE; 356/28, 27, 4; 73/384, 386, 387; 33/227

[56] References Cited
UNITED STATES PATENTS

| | | | |
|---|---|---|---|
| 3,067,617 | 12/1962 | Buck | 250/231 P |
| 3,513,708 | 5/1970 | Springer | 250/231 P |
| 3,573,471 | 4/1971 | K01b | 250/570 X |

Primary Examiner—Walter Stolwein
Attorney, Agent, or Firm—James P. Malone

[57] ABSTRACT

Encoder means adapted to be connected to an altimeter of the type having a rotary shaft output. A rotatably mounted coded disc having code markings on a plurality of circular tracks, is coupled to the output of the altimeter. The code reader comprises a plurality of fiber optic cables, the input ends of said cables being located on one side of said disc and spaced so that each cable is adapted to read code markings on one of said circular tracks. A light source on the other side of said disc. A plurality of photo-sensors are remotely located. Each photo-sensor is located to read the output of one of said filter optic cables, and provides an electric output.

3 Claims, 1 Drawing Figure

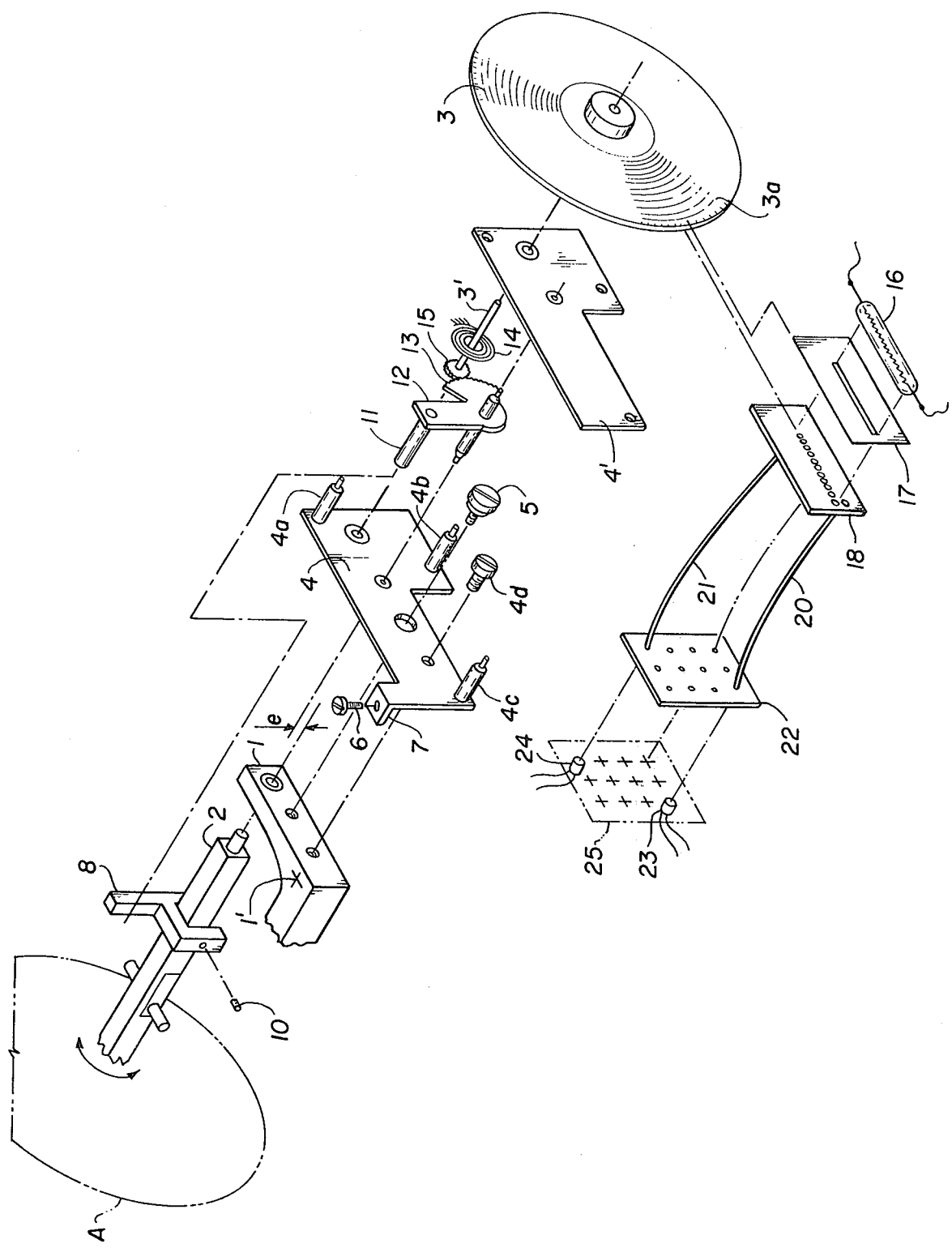

ENCODER FOR ALTIMETERS

This invention relates to encoder means for conventional barometric altimeters and more particularly to an optical encoder having an electrical output.

There is a need to provide altimeters having an electrical output which may be connected to an on-board transponder which is capable of transmitting altitude and airplane identification to a ground controller. This is presently required for more complete and accurate control of the aircraft by the ground controller.

It is desirable that the encoder be capable of connecting to existing barometric altimeters which are in common use in aircraft. It is also desirable that the encoder be made to fit within the existing altimeter casing in existing available space. Means must also be provided to adjust the encoder motion to the full range of the altimeter output without overloading the altimeter output shaft.

The present invention provides an encoder which fulfills the above requirements and which may be adjustably connected to existing conventional barometric altimeters. The present invention is an optical encoder which is adpated to be connected to a conventional barometric altimeter of the type having a rotary shaft output. A rotatably mounted coded disc having code markings on a plurality of circular tracks is adjustably connected to the altimeter output. The coded disc is read by a plurality of photo-sensors which have an electrical output which may be connected to a transponder. Due to space requirements, it is not possible to position the photo-sensors close enough to directly read the coded disc. This problem is solved by utilizing fiber optic cables to read the disc. The other ends of the fiber optic cables are connected to the array of photo-sensors.

Accordingly, a principal object of the invention is to provide new and improved encoder means for altimeters.

Another object of the invention is to provide new and improved encoder means for altimeters which are compact and do not overload the altimeter shaft output.

Another object of the invention is to provide new and improved encoder means for altimeters wherein the encoder is adjustably connected to the altimeter output to adjust the encoder for the full range rotation of the altimeter output shaft.

Another object of the invention is to provide new and improved encoder means adapted to be connected to an altimeter of the type having a rotary shaft output comprising, a rotatably mounted coded disc having code markings on a plurality of circular tracks, means connected to couple said coded disc to the output of said altimeter, and means to read a code on said disc comprising a plurality of fiber optic cables, the input ends of said cables being located on one side of said disc and spaced so that each cable is adapted to read code markings on one of said circular tracks, a light source on the othere side of said disc, and a plurality of photo-sensors, each photo-sensor being located to read the output of one of said filter optic cables.

These and other objects of the invention will be apparent from the following specification and drawing.

Referring to the drawing, it is an exploded view of an embodiment of the invention. The conventional altimeter A has a frame 1, and output shaft 2. The encoder comprises a rotatably mounted disc 3, which is adjustably coupled to the output shaft 2, of the altimeter. The coupling means comprises an adjustable member 4, which is pivotally mounted on the altimeter frame 1, by means of the shoulder screw 5. The adjustment member 4, is connected to a corresponding frame member 4' by means of spacer bars 4a, 4b, 4c. The rotational position of the member 4, may be adjusted by the calibration screw 6, which is threadedly connected to a tab 7, on the member 4. The bottom of the screw bears against the point 1' on the altimeter frame member 1. An encoder drive arm 8, is mounted on the altimeter output shaft 2, by means of the set screw 10.

The screw 4d serves to clamp the member 4 in the adjusted position. The screw 4d is threadedly connected to the member 4 and bears against the altimeter frame member 1.

Mounted on and between the member 4 and 4', is the encoder drive pin 11, which is mounted on a member 12, which is rotatably mounted on the member 4 and 4'. The member 12 contains a sector gear 13, which is mounted on the shaft 3' of the code disc 3. A hair spring 14 is connected on the shaft 3' to spring load the pin 11 against arm 8, and to eliminate backlash between the pinion gear 15 and the sector gear 13.

In operation, as the altimeter output shaft rotates, the arm 8 moves the spring loaded encoder drive pin 11, which rotates the member 12, which in turn rotates the shaft 3' of the code disc 3.

The axis of the encoder input shaft (Encoder sector gear axis) and the axis of the altimeter rocking arm shaft, may be displaced from the nominal co-axial position, to obtain an increase or decrease in angular rotation of the sector gear for a given (i.e., full range) rotation of the altimeter rocking arm shaft by adjusting screw 6.

The code disc 3 has a plurality of code tracks 3a, which may, for instance, be 10 in number. The code may be placed on the disc by punching apertures in the disc. The code disc is read by means of an optical reader comprising the lamp 16 and slit aperture 17, which are located at one side of the disc. On the other side of the disc is mounted bracket 18 which holds the ends of a plurality of fiber optic cables 20, 21, etc. The fiber optic cables are used since the photo-sensors are too large to mount a straight line of them so as to directly read, for instance, ten coding tracks. The other ends of the fiber optical cables are mounted on a bracket 22 with larger spacing between the cable ends so that the cable ends may be aligned with a plurality of photo-sensors 23, 24, etc., mounted on a mounting bracket 25. The photo-sensors have electrical outputs which can be connected to a transponder or other utilization device.

The encoding device has negligible effect on the friction, hysteresis, or scale error of the basic altimeter, and, in no way alters the primary function of the altimeter as a reliable mechanical, visual readout flight instrument. The design of the encoder permits its incorporation on existing altimeter units with minimum modification of the mechanism and without complete disassembly or need for re-calibration.

The present invention, allows some degree of design latitude in the selection of the encoder sector gear/pinion ratio and the angular scale factor on the code disc.

It permits calibration of the encoder shaft rotation with respect to the altimeter pointer reading, to compensate for some gear train manufacturing errors in the basic altimeter, and/or to compensate for systematic gear train errors present in certain designs currently in service.

It makes possible a reduction of the overall scale error of the digitally encoded output compared to the mechanical pointer readout.

The hair-spring eliminates gear train backlash and maintains the encoder drive pin in contact with the encoder drive arm mounted on the Altimeter Output Shaft.

Electrical signals from the photo-sensors are preferably amplified and otherwise conditioned for transmission to the radio transponder by integrated circuit amplifiers within the altimeter case.

The sector gear drives the encoder shaft pinion, thus rotating the coded disc between the light source and the detector slit aperture. Light from the lamp, passing through the clear portions of the code disc and the slit aperture, enters the optical fibers (one fiber per code track) and is transmitted, by total internal reflections, within the fiber optic filaments to nearby photo-sensors. The primary advantage of the use of fiber optics is the design freedom it allows in the selection of the physical size of the photo-sensors and their mounting within the unit.

The Principal Features of the Invention are:

Encoder mechanism can be retrofitted on existing altimeters without:
 a. Affecting performance of basic mechanism.
 b. Requiring modification of basic altitude mechanism.
 c. Increasing size or weight (except a negligible 2 oz.) of existing altimeter.
 d. Disturbing existing aircraft static lines or connections thereby eliminating need for recalibration of static system after installation.
 e. Use of fiber optics allows greater latitude in the selection and location of the photo sensitive elements. E.g., the diameter of the fibers is relatively small allowing for small radial separations of the code tracks and, consequently, a small code disk. The photo sensors are located close to the amplifiers (on the same P.C. board) thus minimizing stray electrical noise. Also, the photo sensors are selected on basis of sensitivity and reliability with size being only a secondary consideration.

Since the encoder assembly is affixed to the basic altimeter mechanism frame, it rotates with the mechanism and its output is independent of altimeter barometric setting. (i.e., Output is always referenced to 0 Feet Altitude = 29.9213 Hq. Pressure)

Removal of electrical power from or electrical malfunction of, the encoder will not affect operation nor accuracy of the visual readout.

I claim:

1. Encoder means adapted to be connected to an altimeter of the type having a rotary shaft output comprising,
 a rotatably mounted coded disc having code markings on a plurality of circular tracks,
 means connected to couple said coded disc to the output of said altimeter, and
 means to read a code on said disc comprising a plurality of fiber optic cables,
 the input ends of said cables being located on one side of said disc and spaced so that each cable is adapted to read code markings on one of said circular tracks,
 a light source on the other side of said disc,
 and a plurality of photo-sensors, each photo-sensor being located to read the output of one of said filter optic cables,
 said coupling means comprising means to adjust the motion of said disc to the full range rotation of the altimeter output shaft,
 said adjusting means comprises an encoder drive arm mounted on the altimeter output shaft,
 an adjustment member pivotally mounted on the altimeter frame,
 an encoder drive pin rotatably mounted on said adjustment member, said drive pin being in drivable contact with said encoder drive arm,
 said encoder drive pin being connected to rotate said disc.

2. Apparatus as in claim 1, wherein said adjustment member includes means to position said adjustment member relative to said altimeter frame to obtain an increase or decrease in angular rotation of the disc for the full range rotation of the altimeter output shaft.

3. Apparatus as in claim 2, wherein said encoder drive pin is geared to the shaft of said disc.

* * * * *